United States Patent
Zeng et al.

(10) Patent No.: US 11,017,520 B2
(45) Date of Patent: May 25, 2021

(54) MULTI-WAVELENGTH INTERFEROMETRY FOR DEFECT CLASSIFICATION

(71) Applicant: KLA Corporation, Milpitas, CA (US)

(72) Inventors: Andrew Zeng, Fremont, CA (US); Helen Heng Liu, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 16/551,155

(22) Filed: Aug. 26, 2019

(65) Prior Publication Data

US 2020/0074617 A1 Mar. 5, 2020

Related U.S. Application Data

(60) Provisional application No. 62/726,782, filed on Sep. 4, 2018.

(51) Int. Cl.
*G06T 7/00* (2017.01)
*G01N 21/88* (2006.01)

(52) U.S. Cl.
CPC ....... *G06T 7/0004* (2013.01); *G01N 21/8806* (2013.01); *G06T 2207/10152* (2013.01)

(58) Field of Classification Search
CPC ........... G01N 21/8806; G01N 21/9501; G01N 21/956; G06T 7/0004; G06T 2207/10152
USPC ........................................................ 348/131
See application file for complete search history.

(56) References Cited

U.S. PATENT DOCUMENTS

| 6,433,876 B1 * | 8/2002 | Kuhn .................. G01B 9/04 356/495 |
| 2001/0013936 A1 * | 8/2001 | Nielsen .............. G01N 21/9501 356/601 |
| 2003/0218742 A1 | 11/2003 | Fashant et al. |
| 2011/0242312 A1 * | 10/2011 | Seki .................. G01N 21/9505 348/125 |

FOREIGN PATENT DOCUMENTS

JP 08327557 A 12/1996
KR 1020090006662 A 1/2009

OTHER PUBLICATIONS

International Search Report dated Dec. 17, 2019 for PCT/US2019/048680.

* cited by examiner

*Primary Examiner* — Nasim N Nirjhar
*Assistant Examiner* — Ana Picon-Feliciano
(74) *Attorney, Agent, or Firm* — Suiter Swantz pc llo

(57) ABSTRACT

An inspection system may include a controller coupled to a differential interference contrast imaging tool for generating images of a sample based on illumination with two sheared illumination beams. The controller may determine a first defect-induced phase shift based on a first set of images of a defect on the sample with a first selected illumination spectrum and two or more selected induced phase differences between the two sheared illumination beams, determine a second defect-induced phase shift based a second set of images of the defect with a second selected illumination spectrum and two or more selected induced phase differences between the two sheared illumination beams, and classify the defect as a metal or a non-metal based on a comparison of the first phase shift to the second phase shift.

27 Claims, 10 Drawing Sheets

MULTI-WAVELENGTH INTERFEROMETRY FOR DEFECT CLASSIFICATION

CROSS-REFERENCE TO RELATED APPLICATION

The present application claims the benefit under 35 U.S.C. § 119(e) of U.S. Provisional Application Ser. No. 62/726,782, filed Sep. 4, 2018, entitled COMPOSITION ANALYSIS OF METAL AND NONMETAL DEFECTS BY USING PHASE CONTRAST IMAGING INTERFEROMETER, naming Andrew Zeng and Helen Heng Liu as inventors, which is incorporated herein by reference in the entirety.

TECHNICAL FIELD

The present disclosure relates generally to defect classification in semiconductor fabrication and, more particularly, to multi-wavelength interferometry for defect classification.

BACKGROUND

Defect detection is a critical step in a semiconductor fabrication process and may be performed at various stages of fabrication to control yield. Further, it may be desirable to identify the composition of an identified defect to facilitate determination of the root cause of the defect. For example, identifying whether an identified particle on a sample is metal or non-metal (e.g., a dielectric) may provide insight into the source of the contamination.

However, typical defect inspection systems are unsuitable for classifying identified defects based on composition. Rather, composition analysis may typically be performed using a separate tool such as an energy-dispersive X-ray (EDX) tool, which may suffer from relatively long measurement times that negatively impact throughput. Additionally, transferring samples between tools may potentially expose samples to further contaminants as well as further decreasing the throughput. There is therefore a need to develop systems and methods to cure the above deficiencies.

SUMMARY

An inspection system is disclosed in accordance with one or more illustrative embodiments of the present disclosure. In one illustrative embodiment, the system includes a controller communicatively coupled to a differential interference contrast imaging tool configured to generate one or more images of a sample based on illumination with two sheared illumination beams, where an illumination spectrum of the two sheared illumination beams and an induced phase difference between the two sheared illumination beams are selectable for any particular image of the sample. In another illustrative embodiment, the controller receives a first set of images of a defect on the sample with a first selected illumination spectrum and two or more selected induced phase differences between the two sheared illumination beams. In another illustrative embodiment, the controller determines a first defect-induced phase shift based on the first selected illumination spectrum. In another illustrative embodiment, the controller receives a second set of images of a defect on the sample with a second selected illumination spectrum different than the first illumination spectrum and two or more selected induced phase differences between the two sheared illumination beams. In another illustrative embodiment, the controller determines a second defect-induced phase shift based on the second selected illumination spectrum. In another illustrative embodiment, the controller classifies the defect as a metal or a non-metal based on a comparison of the first phase shift to the second phase shift.

An inspection system is disclosed in accordance with one or more illustrative embodiments of the present disclosure. In one illustrative embodiment, the system includes a differential interference contrast imaging tool to generate one or more images of the sample based on illumination with two sheared illumination beams, where an illumination spectrum of the two sheared illumination beams and a phase difference between the two sheared illumination beams are selectable for any particular image of the sample. In another illustrative embodiment, the system includes a controller communicatively coupled to the imaging tool. In another illustrative embodiment, the controller receives a first set of images of a defect on the sample with a first selected illumination spectrum and two or more selected induced phase differences between the two sheared illumination beams. In another illustrative embodiment, the controller determines a first phase shift associated with the defect based on the first selected illumination spectrum. In another illustrative embodiment, the controller receives a second set of images of a defect on the sample with a second selected illumination spectrum different than the first illumination spectrum and two or more selected induced phase differences between the two sheared illumination beams. In another illustrative embodiment, the controller determines a second phase shift associated with the defect based on the second selected illumination spectrum. In another illustrative embodiment, the controller classifies the defect as a metal or a non-metal based on a comparison of the first phase shift to the second phase shift.

An inspection method is disclosed in accordance with one or more illustrative embodiments of the present disclosure. In one illustrative embodiment, the method includes receiving a first set of images of a defect on a sample with a first selected illumination spectrum and two or more selected induced phase differences between two sheared illumination beams from a differential interference contrast imaging tool. In another illustrative embodiment, the method includes determining a first defect-induced phase shift based on the first selected illumination spectrum. In another illustrative embodiment, the method includes receiving a second set of images of a defect on the sample with a second selected illumination spectrum different than the first illumination spectrum and two or more selected induced phase differences between the two sheared illumination beams from the differential interference contrast imaging tool. In another illustrative embodiment, the method includes determining a second defect-induced phase shift based on the second selected illumination spectrum. In another illustrative embodiment, the method includes classifying the defect as a metal or a non-metal based on a comparison of the first defect-induced phase shift to the second defect-induced phase shift.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

DETAILED DESCRIPTION

Figure 1:
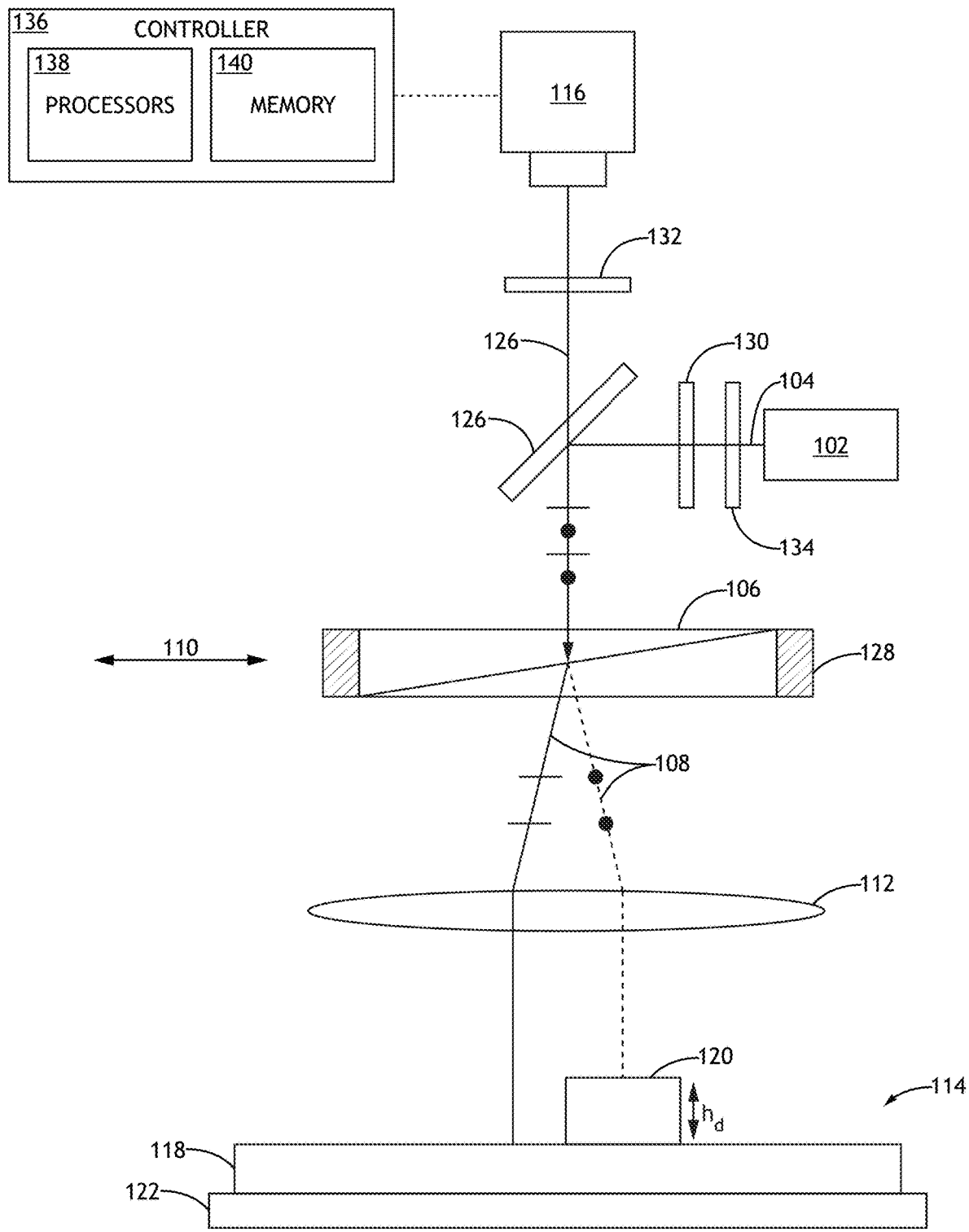
FIG. 1 is a conceptual view of a DIC inspection system in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to systems and methods for multi-wavelength interference-based microscopy to provide both defect identification (e.g., detecting the presence of defects) and classification of the composition of an identified defect based on a reflected phase change (RPC) of the defect.

It is recognized herein that light reflected by a material exhibits a change in amplitude based on the reflectivity of the material as well as a change in phase (e.g., the reflection phase change (RPC)). The amount of RPC induced by a given material may vary based on several factors including, but not limited to, the composition of the material and the wavelength of the incident light. For example, metals may exhibit a nearly constant RPC over a wide range of wavelengths. By way of another example, dielectrics may exhibit an RPC that varies as a function of wavelength.

In one embodiment of the present disclosure, a defect may be both identified (e.g., detected) and classified using multi-wavelength differential interference contrast (DIC) microscopy. A DIC inspection system may generate an image of a sample, or a portion thereof, by shearing an illumination beam into two sheared beams, illuminating the sample with the sheared beams, and recombining the sheared beams to form an image captured by a detector. Contrast in the corresponding image (e.g., variations in intensity of light and thus detected signal strength) is related to interference the combined sheared beams at the detector based on an optical phase of the combined light on the detector. This optical phase may be influenced by multiple factors including, but not limited to, an optical path difference (OPD) between optical paths of the two sheared beams as they propagate through the system and reflect off of the sample, a difference between the RPC introduced to the two sheared beams upon reflection. In the context of inspection systems, the presence of a defect on the sample may induce a phase shift associated with both an OPD based on the defect height as well as an RPC difference between the defect and the surrounding material. It may also be the case that a DIC inspection system may further introduce a phase shift based on the particular configuration of components in the optical paths of the sheared beams. For example, the optical paths of the sheared beams may differ based on the position and/or orientation of the shearing prism.

Additional embodiments of the present disclosure are directed to performing a phase retrieval analysis to extract or otherwise isolate the contribution of a defect to a DIC signal. For example, a DIC inspection system may utilize a phase shifting technique to isolate the defect-induced phase shift based on multiple images of a sample with different induced phase offsets between the sheared illumination beams.

Additional embodiments of the present disclosure are directed to classifying a defect based on comparing a defect-induced phase shift associated with two or more wavelengths. For example, a DIC inspection system may image a sample, or a portion thereof, with two or more wavelengths and classify identified defects based on a comparison of defect-induced phase shifts for each wavelength. Further, the DIC inspection system may perform a phase retrieval analysis based on multiple images at each wavelength to extract the defect-induced OPD for each wavelength.

As described above, the RPC of metals may be substantially constant as a function of wavelength, whereas the RPC of many non-metals such as, but not limited to, dielectrics may vary as a function of wavelength. Thus, comparing the defect-induced phase shift (or a difference in RPC between a defect and surrounding material if determined directly) generated with different wavelengths may provide insight into the composition of a defect. For example, an identified defect may be classified by determining a ratio of defect-induced phase shifts generated with two different wavelengths. In one instance, a defect may be classified as metallic when the ratio is within a selected tolerance of 1, and may be classified as a nonmetal (e.g., dielectric) otherwise.

In some embodiments, the RPC is extracted or otherwise isolated from the defect-induced OPD. In this regard, the contribution of the defect height, which does not vary with imaging wavelength, may be removed. For example, a defect may be classified based on a comparison of the RPC at two or more wavelengths. In some instances, the RPC of particular materials (e.g., particular metals or dielectric materials) at particular wavelengths may be known based on theory and/or experimental data. Accordingly, the composition of the defect may be identified based on a comparison of measured values of the RPC to these known values.

Referring now to FIGS. 1 through 9, systems and methods for defect identification and classification based on multi-wavelength differential interference contrast (DIC) inspection are described in accordance with one or more embodiments of the present disclosure.

FIG. 1 is a conceptual view of a DIC inspection system 100 in accordance with one or more embodiments of the present disclosure.

In one embodiment, the DIC inspection system 100 includes an illumination source 102 to generate an illumination beam 104, a shearing prism 106 to split the illumination beam 104 into two sheared beams 108 separated along a shearing direction 110, an objective lens 112 to direct the two sheared beams 108 to a sample 114 at spatially-separated locations, and a detector 116 to capture an image of the sample 114 based on the interference between the two sheared beams 108. In FIG. 1, the sample 114 is illustrated as a substrate 118 and a defect 120. Further, the sample 114 may be mounted on a translation stage 122 to control the position of the sample 114 within a field of view of the DIC inspection system 100. For example, the translation stage 122 may include, but is not limited to, any combination of linear, rotation, or tip/tilt actuators.

In another embodiment, the objective lens 112 further collects portions of the sheared beams 108 reflected from the sample 114 (e.g., reflected light 124) such that the reflected light 124 associated with the two sheared beams 108 is recombined by the shearing prism 106 along a common optical path. Further, as illustrated in FIG. 1, the DIC inspection system 100 may include a beamsplitter 126 to separate the illumination beam 104 from the combined reflected light 124 along the common optical path towards the detector 116.

The shearing prism 106 may be any type of optical element known in the art suitable for shearing the illumination beam 104 into two sheared beams 108. For example, the shearing prism 106 may include a polarizing prism that separates the illumination beam 104 into sheared beams 108 based on polarization. For instance, the sheared beams 108 may include a Nomarski prism, a Wollaston prism, a Rochon prism, or the like, where the two sheared beams 108 correspond to ordinary and extraordinary rays.

In another embodiment, the DIC inspection system 100 includes a phase-adjustment sub-system 128 configured to introduce, adjust, or otherwise control a relative optical path difference (OPD) between the optical paths of the two sheared beams 108 through the system, including reflection by the sample 114. For example, as illustrated in FIG. 1, the phase-adjustment sub-system 128 may include an actuator (e.g., a translation stage, or the like) coupled to a mount securing the shearing prism 106. In this regard, the phase-adjustment sub-system 128 may control the OPD between the sheared beams 108 by adjusting a position of the shearing prism 106. By way of another example, though not shown, the phase-adjustment sub-system 128 may include a de Sénarmont compensator.

In another embodiment, the DIC inspection system 100 includes one or more polarization-controlling optics to modify the polarization of light at any location. For example, the DIC inspection system 100 may include a polarizer 130 to provide a linearly-polarized illumination beam 104 on the shearing prism 106. By way of another example, the DIC inspection system 100 may include an analyzer 132 to isolate the reflected light 124 associated with reflections of the sheared beams 108 and facilitate high-contrast interference at the detector 116. By way of another example, the DIC inspection system 100 may include a half-wave plate 134 to adjust the orientation of the linearly-polarized illumination beam 104 such that the sheared beams 108 have equal intensities. For instance, in the case of a polarizing shearing prism 106, the sheared beams 108 may have equal intensities when the polarization of the illumination beam 104 is oriented at 45 degrees with respect to the optic axes of one or more birefringent materials forming the shearing prism 106. Accordingly, a half-wave plate 134 may allow precise adjustment of the polarization of the illumination beam 104 on the shearing prism 106 regardless of the orientation or initial polarization of the illumination source 102.

In another embodiment, though not shown, the DIC inspection system 100 may include beam-conditioning optics to control, shape, or otherwise adjust the properties of light at any point in the DIC inspection system 100. For example, the beam-conditioning optics may include, but are not limited to, one or more spectral filters, one or more neutral density filters, one or more apertures, or one or more homogenizers.

The illumination source 102 may include any type of light source known in the art suitable for generating an illumination beam 104 including, but not limited to, a laser source, a light-emitting diode (LED) source, a lamp source, or a laser-sustained plasma (LSP) source. Further, the illumination source 102 may generate an illumination beam 104 having any selected spectrum. For example, the illumination beam 104 may include any combination of ultraviolet (UV), visible, or infrared (IR) light. By way of another example, the illumination beam 104 may include short-wavelength light such as, but not limited to, extreme ultraviolet (EUV), deep ultraviolet (DUV), or vacuum ultraviolet (VUV) light.

In another embodiment, the illumination source 102 is a tunable light source, where the spectrum (e.g., the center wavelength, the bandwidth, or the like) of the illumination beam 104 may be selectively tuned. In this regard, the DIC inspection system 100 may operate as a multi-wavelength inspection system.

The illumination source 102 may include any type of tunable light source known in the art. In one embodiment, the illumination source 102 includes a light emitter with a tunable emission spectrum such as, but not limited to, a tunable laser source. In another embodiment, the illumination source 102 includes a broadband light source coupled to one or more spectral filters to provide the illumination beam 104 with a selected spectrum. For example, the spectral filters may include one or more selectively rotatable angularly-tunable filters, where spectral filtering properties may be tuned by adjusting an incidence angle of light. By way of another example, the spectral filters may include one or more fixed-spectrum filters that may be selectively placed in the optical path of broadband light from the broadband light source (e.g., using a filter wheel, one or more independent actuators, or the like) to provide the illumination beam 104 with a selected spectrum.

In another embodiment, the detector 116 is a multi-pixel detector such that the DIC inspection system 100 may operate as a multi-pixel imaging system. For example, the sheared beams 108 may illuminate an extended portion of the sample 114, which is then imaged on to the detector 116 (e.g., using the objective lens 112 as well as any additional lenses suitable for imaging the sample 114). It is recognized herein that a multi-pixel DIC inspection system 100 may provide relatively higher resolution and/or detection sensitivity than a single-pixel inspection system (e.g., a scanning DIC system). For instance, the DIC inspection system 100 may combine a high-resolution objective lens 112, a low-noise detector 116, and a low-noise illumination source 102 to achieve highly sensitive defect detection and classification with resolution on the order of nanometers or lower in the longitudinal (e.g., height) direction and a few microns or lower in lateral directions.

Further, the detector 116 may generate an image of a static or moving sample 114. For example, a detector 116 suitable for capturing an image of a static sample may include, but is not limited to, a charge-coupled device (CCD) or a complementary metal-oxide-semiconductor (CMOS) device. By way of another example, a detector 116 suitable for capturing an image of a moving sample may include, but is not limited to, a line-scan sensor or a time delay integration (TDI) sensor.

In another embodiment, the DIC inspection system 100 includes a controller 136. In another embodiment, the controller 136 includes one or more processors 138 configured to execute a set of program instructions maintained in a memory medium 140, or memory. Further, the controller 136 may include one or more modules containing one or more program instructions stored in the memory medium 140 executable by the processors 138. The processors 138 of a controller 136 may include any processing element known in the art. In this sense, the processors 138 may include any microprocessor-type device configured to execute algorithms and/or instructions. In one embodiment, the processors 138 may consist of a desktop computer, mainframe computer system, workstation, image computer, parallel processor, or any other computer system (e.g., networked computer) configured to execute a program configured to operate the DIC inspection system 100, as described throughout the present disclosure. It is further recognized that the term "processor" may be broadly defined to encompass any device having one or more processing elements, which execute program instructions from a non-transitory memory medium 140.

The memory medium 140 may include any storage medium known in the art suitable for storing program instructions executable by the associated processors 138. For example, the memory medium 140 may include a non-transitory memory medium. As an additional example, the memory medium 140 may include, but is not limited to, a read-only memory, a random-access memory, a magnetic or optical memory device (e.g., disk), a magnetic tape, a solid state drive and the like. It is further noted that memory medium 140 may be housed in a common controller housing with the processors 138. In one embodiment, the memory medium 140 may be located remotely with respect to the physical location of the processors 138 and controller 136. For instance, the processors 138 of controller 136 may access a remote memory (e.g., server), accessible through a network (e.g., internet, intranet and the like). Therefore, the above description should not be interpreted as a limitation on the present invention but merely an illustration.

The controller 136 may be communicatively coupled with any components of the DIC inspection system 100. In one embodiment, the controller 136 receives data from one or more components of the DIC inspection system 100. For example, the controller 136 may receive images, or portions thereof, from the detector 116. In another embodiment, the controller 136 performs one or more processing steps of the present disclosure. For example, the controller 136 may receive images of the sample 114 generated with different induced phases (e.g., based on different configurations of the phase-adjustment sub-system 128) and perform one or more analysis steps (e.g., a phase retrieval analysis) to isolate the defect-induced phase shift. By way of another example, the controller 136 may receive images of the sample 114, or a portion thereof, generated using different wavelengths of the illumination beam 104 and classify one or more details based on defect-induced phase shift for each wavelength.

In another embodiment, the controller 136 may generate one or more control signals to direct or otherwise control components of the DIC inspection system 100. The controller 136 may generate control signals for any component of the DIC inspection system 100 including, but not limited to, the detector 116, the translation stage 122, or the illumination source 102.

Referring now to FIGS. 2 through 9, defect detection and classification based on multi-wavelength DIC interferometry is described in greater detail in accordance with one or more embodiments of the present disclosure.

Contrast in an image generated by a DIC inspection system 100 (e.g., as illustrated in FIG. 1) may generally be related to interference between the reflected light 124 associated with the reflection of the sheared beams 108 from spatially offset portions of the sample. In particular, as illustrated in FIG. 1, it may be the case that one of the sheared beams 108 may be incident on a defect having a height ($h_d$), while the other may not. The intensity of light in this case may be generally characterized as:

$$I = I_1 R_d + I_2 R_s + 2\sqrt{I_1 R_d I_2 R_s} \cos\phi \quad (1)$$

and $$\phi = \Delta\phi_d + \Delta\phi_s = \frac{4\pi h_d}{\lambda} + \Delta\phi_r + \Delta\phi_s, \quad (2)$$

where $I_1$ and $I_2$ are intensities of the two sheared beams 108, $R_d$ is a reflectivity of a defect, $R_s$ is a reflectivity of the sample 114 surrounding a defect, $\Delta\phi_d$ is a defect-induced phase difference, and $\Delta\phi_s$ is a system-induced phase difference. For example, the value of $\Delta\phi_s$ may be related to a particular location and/or orientation of the shearing prism 106.

As described above, the defect-induced phase difference ($\Delta\phi_d$) may be based on both the defect height ($h_d$) with respect to the surrounding material and the difference between the RPC of the defect and the surrounding material. In particular, the defect-induced phase difference ($\Delta\phi_d$) may be variously written as:

$$\Delta\phi_d = 2\frac{2\pi}{\lambda}nh_d + \Delta\phi_r = 2\frac{2\pi}{\lambda}n(h_d + h_{RPC}) = 2\frac{2\pi}{\lambda}nh_{TOT} \quad (3)$$

where n is the refractive index, $\Delta\phi_r$ is a phase difference associated with a difference in RPC of the defect and surrounding portions of the sample 114 and $h_{TOT}$ is an apparent height of the defect (e.g., apparent OPD of the defect) based on both the actual height $h_d$ and an additional contribution $h_{RPC}$ based on the RPC difference between the defect and the sample 114 surrounding the defect. The factor of 2 in equation (3) accounts for the round-trip path of reflected light in the DIC inspection system 100.

It is recognized herein that RPC generally depends on various factors such as, but not limited to, material composition, material size, and wavelength of incident light.

Accordingly, comparing the defect-induced phase ($\Delta\phi_d$) and/or the RPC difference ($\Delta\phi_r$) itself associated with multiple wavelengths may facilitate classification of a defect based on these factors.

Figure 2:
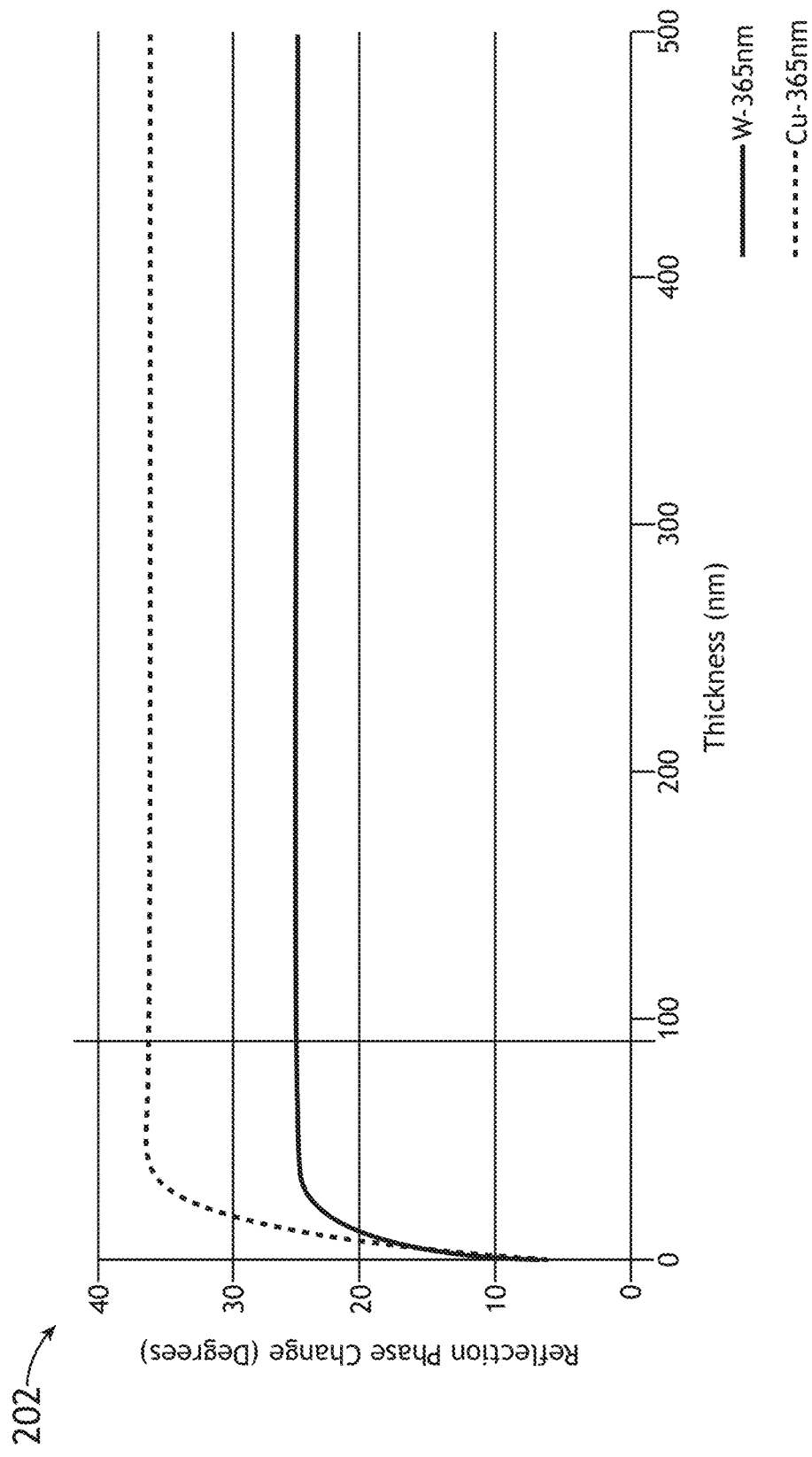
FIG. 2 is a simulated plot of the RPC of Tungsten (W) and Copper (Cu) on a silicon substrate as a function of thickness at a wavelength of 365 nm, in accordance with one or more embodiments of the present disclosure.
Figure 3:
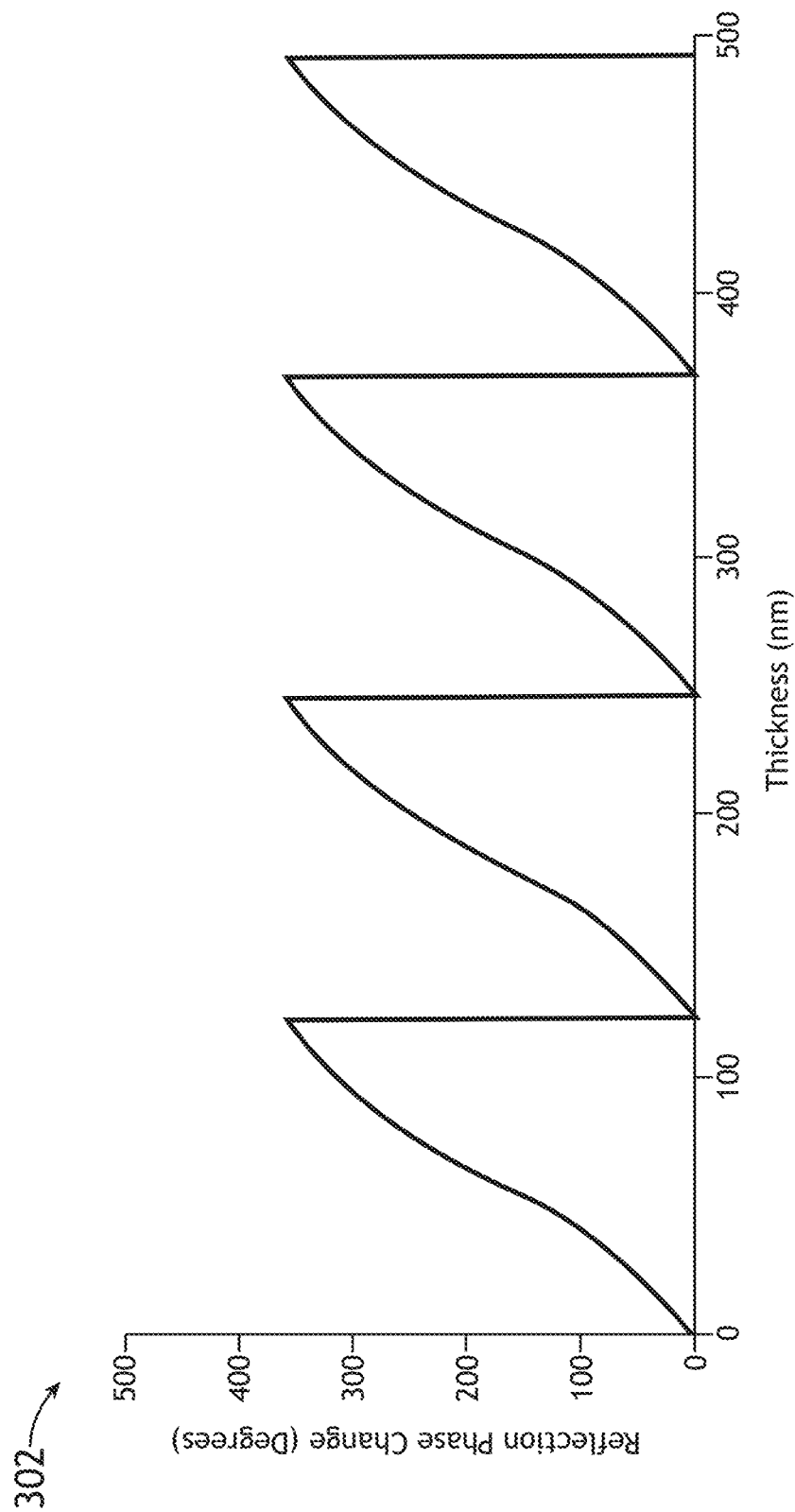
FIG. 3 is a simulated plot of the RPC of $SiO_2$ on a silicon substrate as a function of thickness at a wavelength of thickness at a wavelength of 365 nm, in accordance with one or more embodiments of the present disclosure.

FIGS. 2 and 3 show the RPC of metals and non-metals as a function of defect thickness (size) at a common wavelength. FIG. 2 is a simulated plot 202 of the RPC of two metals, Tungsten (W) and Copper (Cu) on a silicon substrate as a function of thickness at a wavelength of 365 nm, in accordance with one or more embodiments of the present disclosure. FIG. 3 is a simulated plot 302 of the RPC of $SiO_2$ on a silicon substrate as a function of thickness at a wavelength of thickness at a wavelength of 365 nm, in accordance with one or more embodiments of the present disclosure.

FIGS. 2 and 3 include simulations of thin films using a thin film model, which provides a first approximation of the RPC of associated defects. As illustrated in FIG. 2, the RPC for metals is constant when the defect size is greater than approximately 100 nm. Further, the amount of RPC varies substantially based on the composition of the metal. In contrast, as illustrated in FIG. 3, the RPC of $SiO_2$ is strongly dependent on thickness. Further, it is noted that FIG. 3 illustrates a wrapped phase with a modulus of 360 degrees ($2\pi$ rad).

Figure 4:
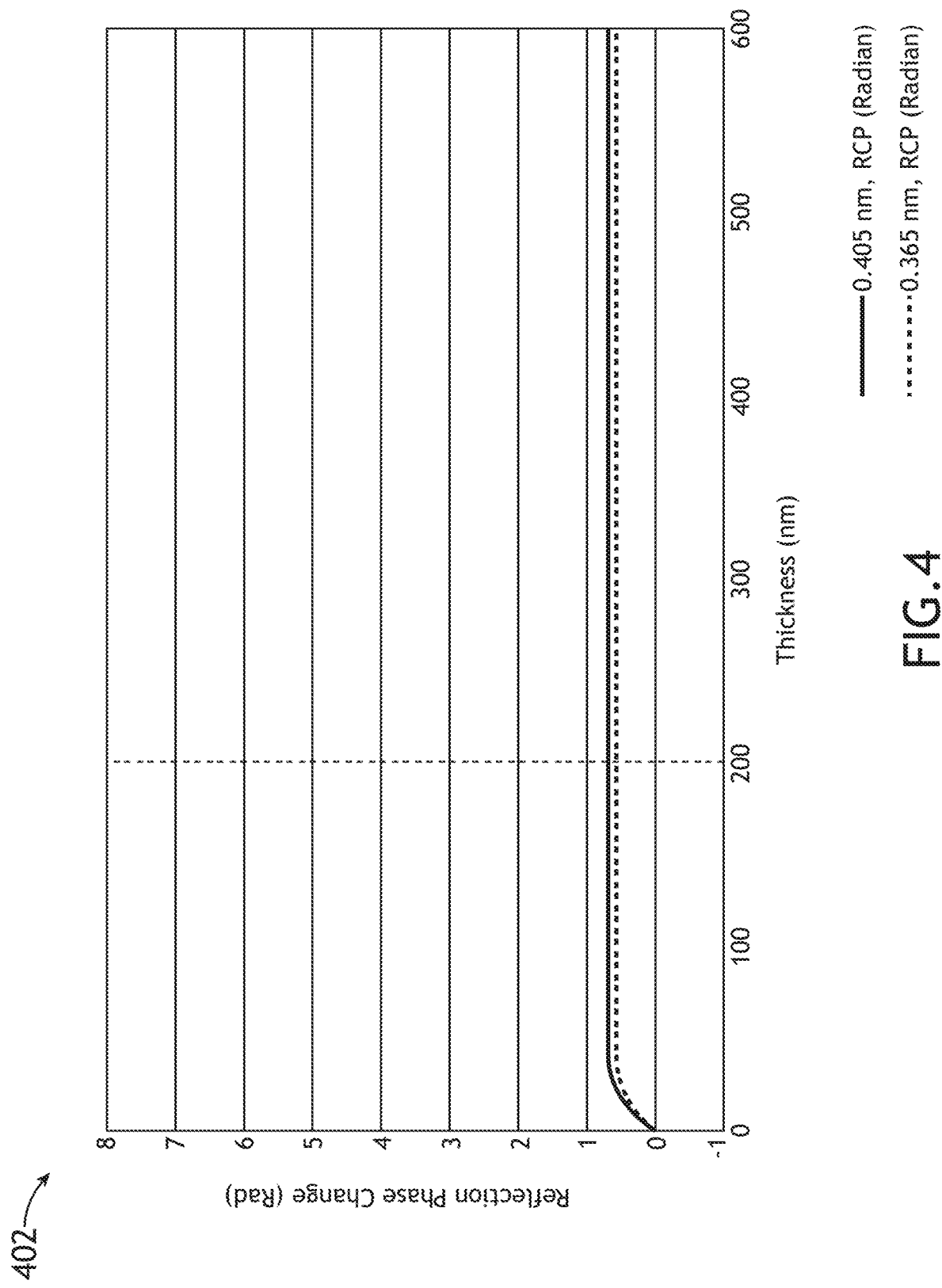
FIG. 4 is a plot of copper (Cu) on a silicon substrate as a function of thickness, in accordance with one or more embodiments of the present disclosure.
Figure 5:
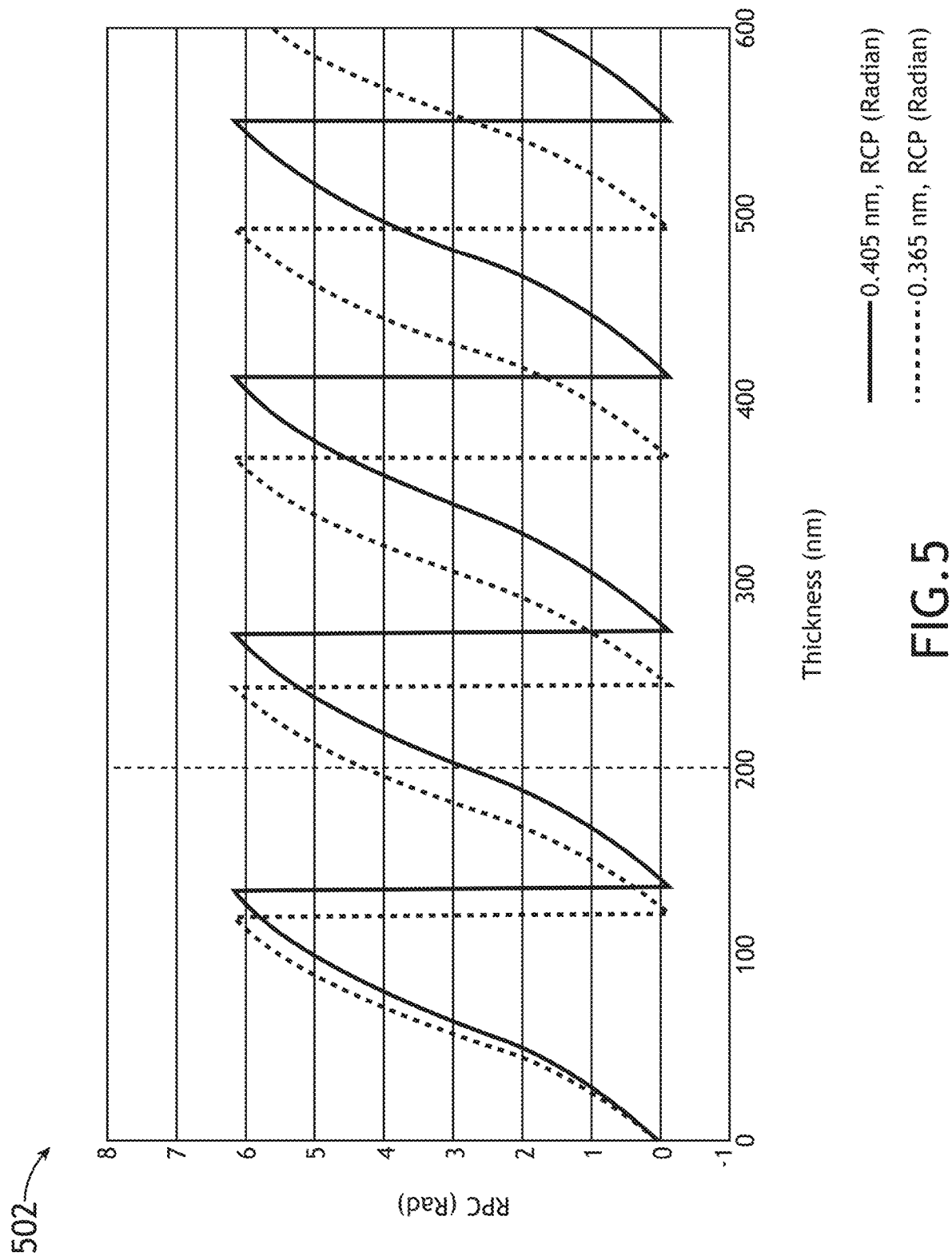
FIG. 5 is a plot of copper $SiO_2$ on a silicon substrate as a function of thickness, in accordance with one or more embodiments of the present disclosure.

FIGS. 4 and 5 show the RPC of metals and non-metals as a function of defect thickness (size) at multiple wavelengths (365 nm and 405 nm), in accordance with one or more embodiments of the present disclosure. Accordingly, FIGS. 4 and 5 illustrate how variations of the RPC as a function of wavelength may be exploited for defect classification. FIG. 4 is a plot 402 of copper (Cu) on a silicon substrate as a function of thickness, in accordance with one or more embodiments of the present disclosure. FIG. 5 is a plot 502 of copper $SiO_2$ on a silicon substrate as a function of thickness, in accordance with one or more embodiments of the present disclosure.

As illustrated in FIG. 4, the RPC of metals exhibits a relatively small dependence on wavelength (e.g., less than 5 degrees) for nearly all sizes greater than 200 nm. In contrast, as illustrated in FIG. 5, the RPC of SiO2 exhibits a relatively large dependence on wavelength (e.g., greater than 90 degrees) for sizes greater than approximately 200 nm.

Referring now to Table 1 below, RPC values for a variety of material and sizes are summarized to further highlight the RPC dependence on material composition, size, and wavelength.

TABLE 1

| Material | Size (nm) | RPC at 365 nm (deg) | RPC at 405 nm (deg) | Difference (deg) |
|---|---|---|---|---|
| Al | ≥100 | 22.5 | 22.9 | 0.4 |
| W | ≥100 | 25.2 | 20.9 | −4.3 |
| Ti | ≥100 | 36.8 | 39.3 | 2.5 |
| Fe | ≥100 | 29.9 | 27.6 | −2.3 |
| Cu | ≥100 | 36.1 | 36.08 | −.02 |
| $SiO_2$ | 200 | 252 | 155.5 | −96.5 |
| $SiO_2$ | 250 | 11 | 315.3 | 304.3 |
| $SiO_2$ | 300 | 152.5 | 45.5 | −107 |

Considering FIGS. 2 through 5 and Table 1, the RPC of metals varies based on the particular composition of the metal, but is relatively constant as a function of illumination wavelength and size regardless of the composition. In contrast, the RPC of non-metals, as exemplified by, but not limited to, $SiO_2$, exhibits a relatively large dependence on for defect sizes greater than approximately 200 nm. In one embodiment, a defect may be classified as a metal or a non-metal based on a measured variation of the RPC as a function of wavelength, where variations beyond a selected threshold indicate a non-metallic defect.

Referring now to FIGS. 6 through 9, classification of defects based on measured DIC signals is described in greater detail, in accordance with one or more embodiments of the present disclosure.

As shown in equations (1)-(3) above, the intensity I of light at a particular position on the detector 116 depends in part on the optical phase ($\phi$) at the detector 116 associated with the reflected light 124 recombined by the shearing prism 106. Further, this optical phase ($\phi$) may include a system-induced phase shift ($\Delta\phi_s$) as well as a defect-induced phase-shift ($\Delta\phi_d$).

In one embodiment, the defect-induced phase-shift ($\Delta\phi_d$) is extracted or otherwise separated from the system-induced phase shift ($\Delta\phi_s$) using a phase retrieval analysis (e.g., by the controller 136) to isolate the impact of the RPC on the intensity I. The defect-induced phase-shift ($\Delta\phi_d$) may be extracted or otherwise separated from the system-induced phase shift ($\Delta\phi_s$) using any technique or combination of techniques known in the art. In one embodiment, the defect-induced phase-shift ($\Delta\phi_d$) may be extracted using a phase-shifting analysis. For example, the defect-induced phase-shift ($\Delta\phi_d$) associated with an identified defect may be determined based on multiple images of the defect with different (e.g., selected) system-induced phase shifts ($\Delta\phi_s$) at each wavelength. For example, as described previously herein, the system-induced phase shift ($\Delta\phi_s$) may be adjusted using a phase-adjustment sub-system 128, which may include, but is not limited to, an actuator to translate the shearing prism 106 along the shearing direction 110. In this regard, the variations in the intensity (I) in response to the sequence of selected system-induced phase shifts ($\Delta\phi_s$) may isolate the contribution of the selected system-induced phase shifts ($\Delta\phi_s$) such that the defect-induced phase-shift ($\Delta\phi_d$) may be determined. Further, the phase retrieval analysis may be applied for multiple images at each of two or more wavelengths in order to extract the defect-induced phase-shift ($\Delta\phi_d$) associated with each of the two or more wavelengths. In another embodiment, the defect-induced phase-shift ($\Delta\phi_d$) may be separated from the system-induced phase shifts ($\Delta\phi_s$) using a low-pass filter such as, but not limited to, a moveable median filter. It is recognized herein that the system-induced phase shifts ($\Delta\phi_s$) may result from sources such as, but not limited to, a non-uniform difference between the sheared beams 108 (e.g., extraordinary and ordinary beams from the shearing prism 106) or a local slope associated with natural or sample-holder-induced variations of the surface of the sample 114. Further, these system-induced phase shifts ($\Delta\phi_s$) may have a relatively slowly-varying frequency such that the low-pass filter may separate a defect-induced phase-shift ($\Delta\phi_d$) from the system-induced phase shifts ($\Delta\phi_s$).

Additionally, the multiple images with different selected system-induced phase shifts ($\Delta\phi_s$) may be generated using any imaging technique known in the art. For example, in the case of a DIC inspection system 100 configured to image a static sample 114, the multiple images may be taken sequentially using different selected system-induced phase shifts ($\Delta\phi_s$) while the sample 114 remains stationary. By way of another example, in the case of a DIC inspection system 100 configured to image a moving sample 114, the multiple images may be taken using multiple sequential scans using different selected system-induced phase shifts ($\Delta\phi_s$).

Figure 6:
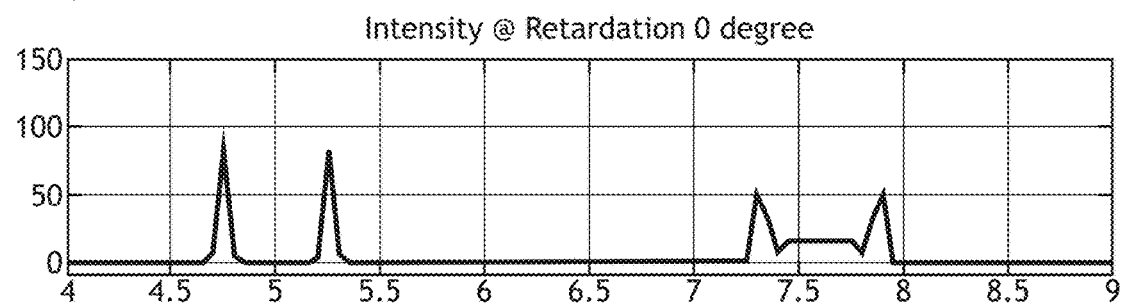
FIG. 6 includes simulated plots of the intensity of a defect generated using multiple sequential scans with four different selected system-induced phase shifts, in accordance with one or more embodiments of the present disclosure.
Figure 6:
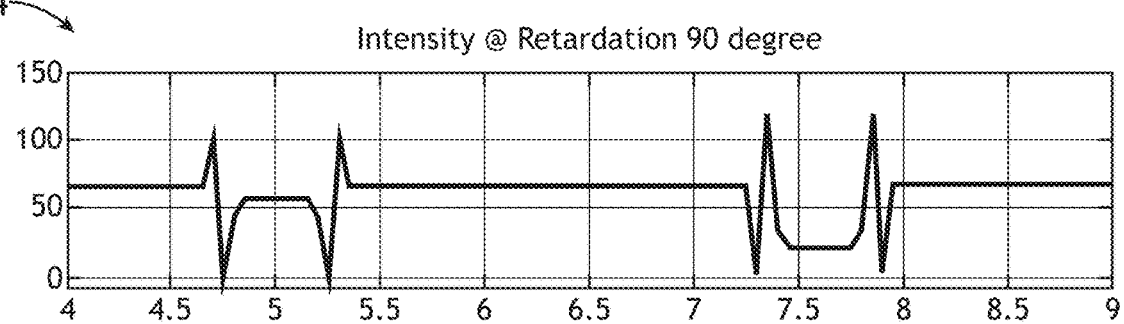
Figure 6:
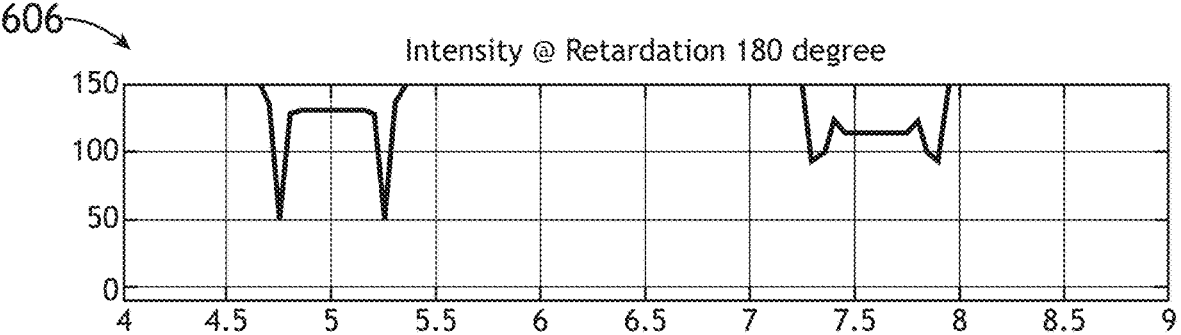
Figure 6:
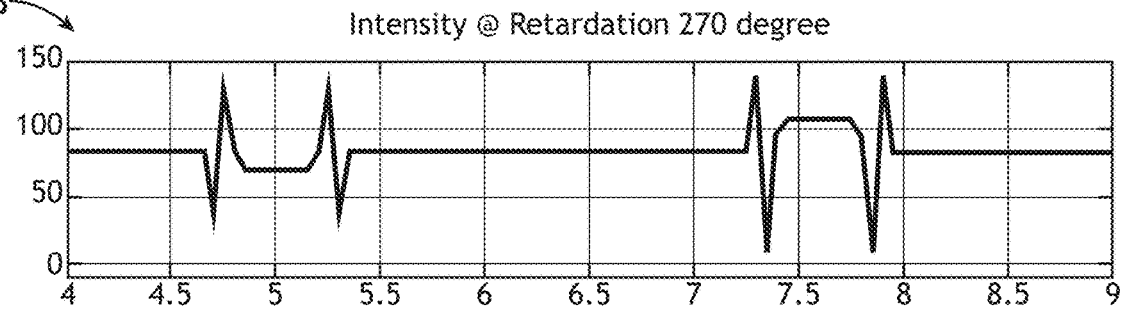
Figure 7:
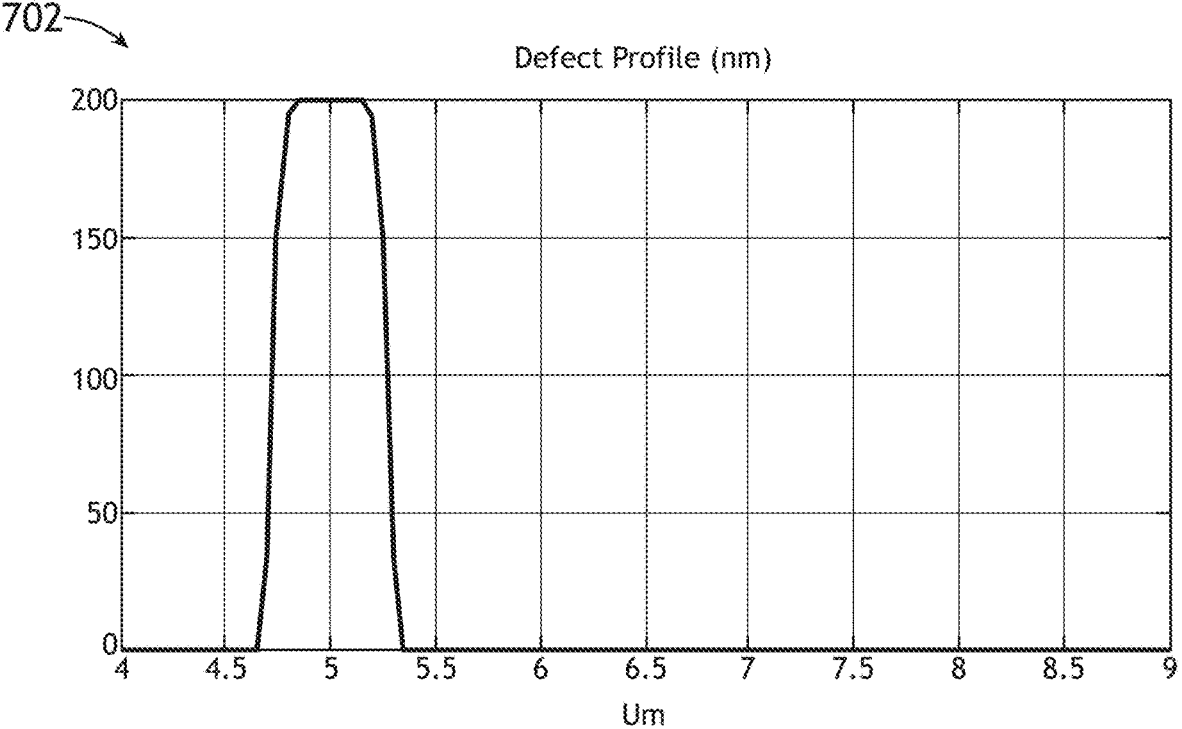
FIG. 7 includes a plot of a defect profile and a plot of simulated and reconstructed defect-induced phase-shifts based on the plots in FIG. 6, in accordance with one or more embodiments of the present disclosure.
Figure 7:
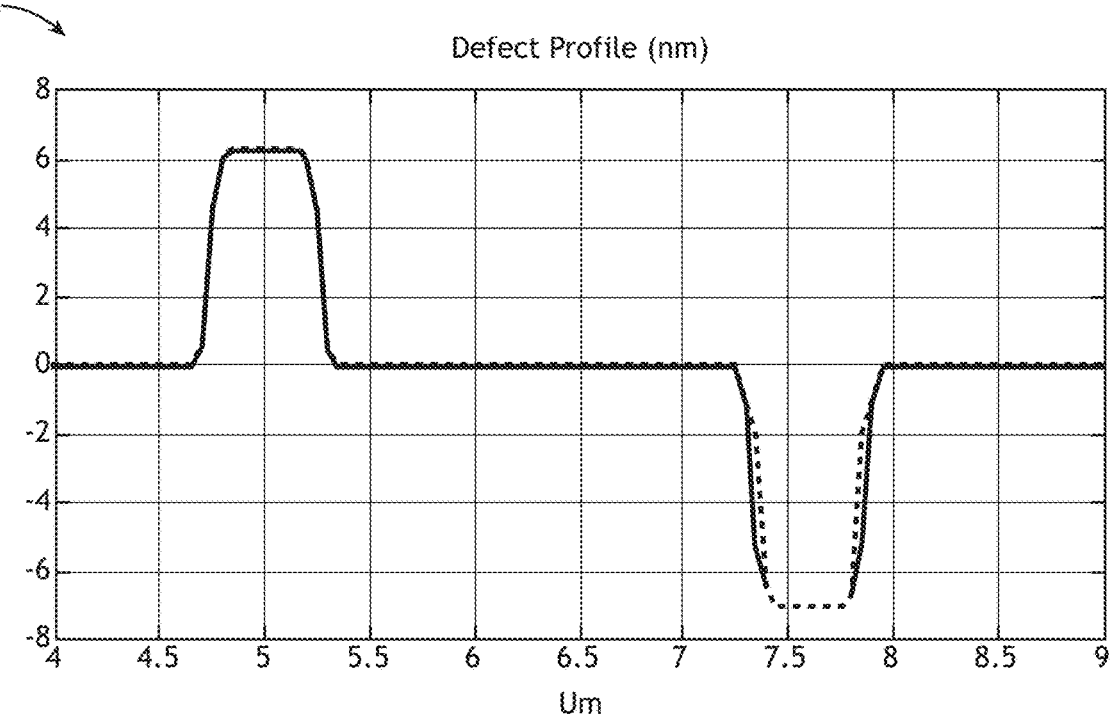

FIG. 6 includes simulated plots 602-608 of the intensity (I) of a defect generated using multiple sequential scans with four different selected system-induced phase shifts ($\Delta\phi_s$) (0 degrees, 90 degrees, 180 degrees, and 270 degrees, respectively), in accordance with one or more embodiments of the present disclosure. FIG. 7 includes a plot 702 of a defect profile (e.g., a height ($h_d$)) and a plot 704 of simulated and reconstructed defect-induced phase-shifts ($\Delta\phi_d$) based on the plots in FIG. 6, in accordance with one or more embodiments of the present disclosure. As illustrated in FIG. 7, a phase retrieval analysis based on multiple images based on different selected system-induced phase shifts ($\Delta\phi_s$) may accurately extract the defect-induced phase-shift ($\Delta\phi_d$). Accordingly, the DIC inspection system 100 may classify a defect based on a comparison of defect-induced phase-shifts ($\Delta\phi_d$) associated with two or more wavelengths.

Figure 8:
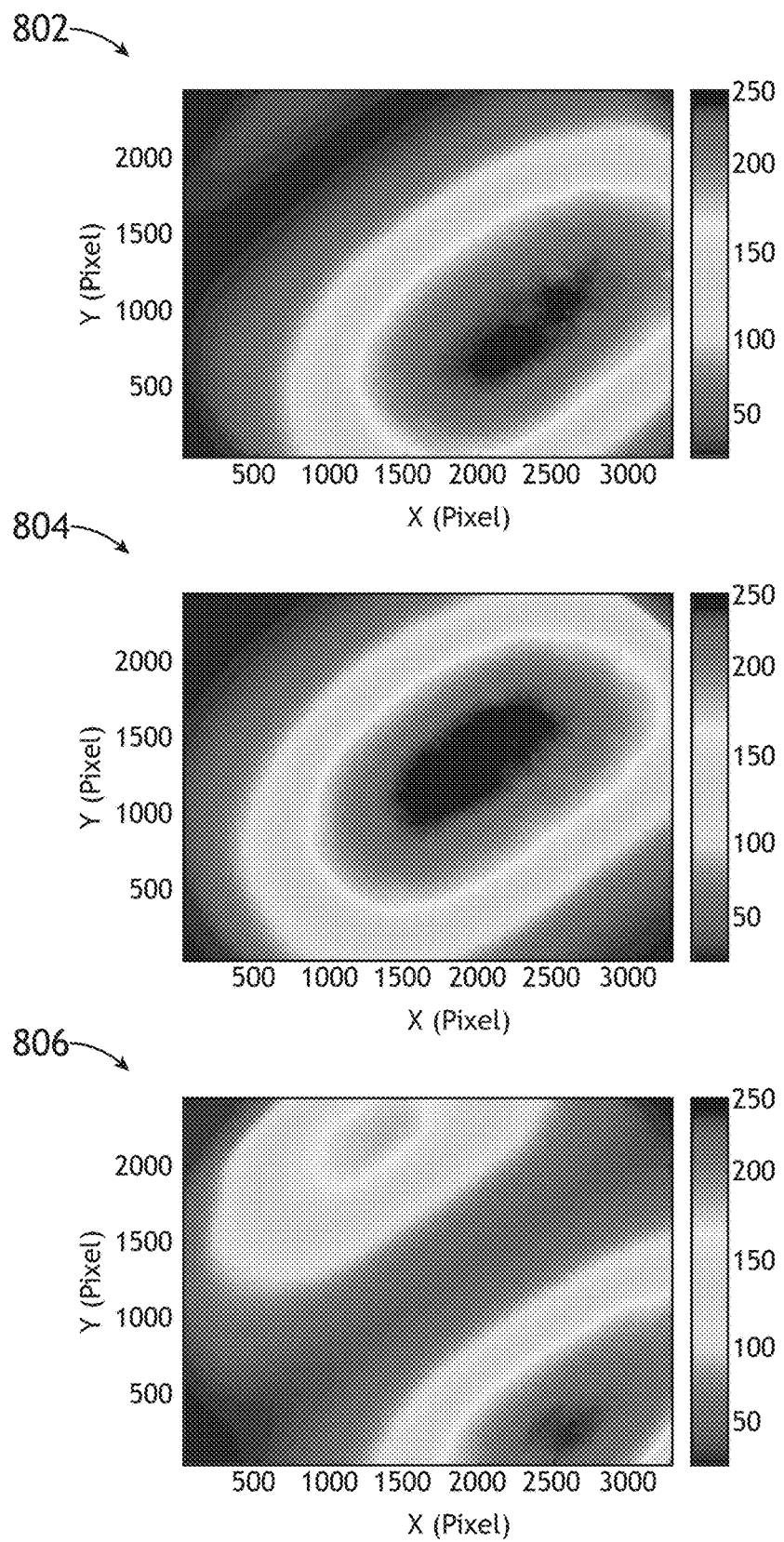
FIG. 8 includes three measured images of a sample without a defect, in accordance with one or more embodiments of the present disclosure.
Figure 9:
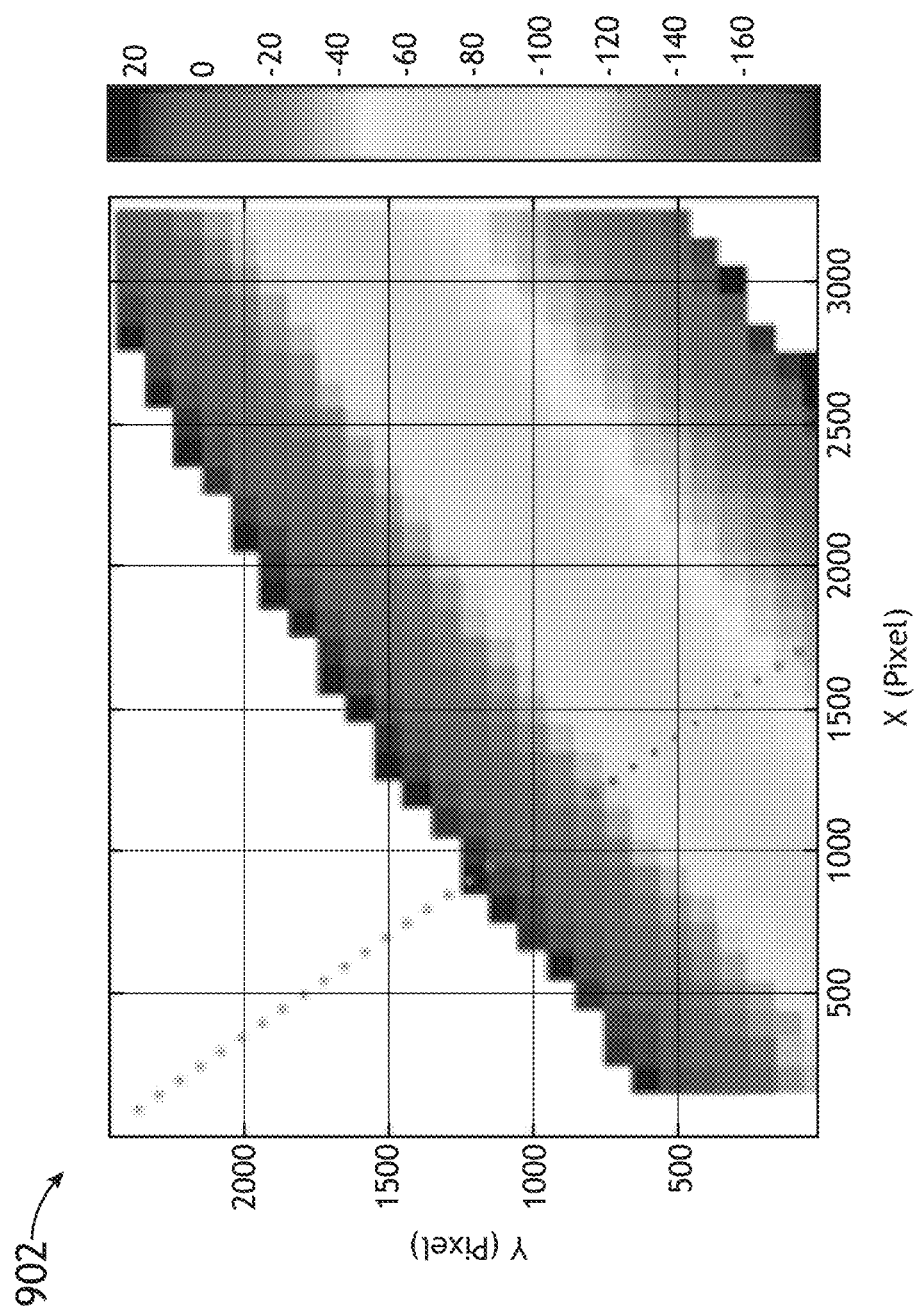
FIG. 9 is a plot of a reconstructed phase-shift of the sample imaged in FIG. 8, in accordance with one or more embodiments of the present disclosure.

Referring now to FIGS. 8 and 9, phase extraction of a defect-free sample 114 based on multiple static images of a stationary sample with eleven selected system-induced phase shifts ($\Delta\phi_s$) are shown. FIG. 8 includes three of the eleven measured images 802-806 of a defect-free sample 114, in accordance with one or more embodiments of the present disclosure. FIG. 9 is a plot 902 of a reconstructed phase-shift of the sample 114 imaged in FIG. 8, in accordance with one or more embodiments of the present disclosure. In particular, the shearing direction 110 associated with FIGS. 8 and 9 is 45 degrees in the respective plots. Further, FIGS. 8 and 9 may demonstrate the ability to extract (e.g. reconstruct) a phase-shift using phase extraction techniques disclosed herein, even in the presence of optical non-uniformity by the illumination beam 104. It is recognized herein that the phase extraction techniques disclosed herein may be utilized to characterize phase shifts induced by inherent variations of the surface of the sample 114 as well as phase shifts induced by one or more defects.

Referring again to equations (1)-(3) above, a difference between the RPC and a surrounding portion of the sample 114 may manifest as a variation in the defect-induced phase-shift ($\Delta\phi_d$) such that a comparison of the defect-induced phase-shift ($\Delta\phi_d$) for different wavelengths may facilitate classification of the defects. Table 2 below provides simulated data associated with defect-induced phase-shifts ($\Delta\phi_d$) associated with multiple wavelengths is shown for defect sizes in the range of 200-350 nm, in accordance with one or more embodiments of the present disclosure. In particular, Tables 2 includes the simulated values of $h_{RPC}$ and $h_{TOT}$.

TABLE 2

| Material | Defect Size (nm) | λ | $h_{RPC}$ | $h_{TOT}$ | $\frac{h_{TOT}(\lambda = 365 \text{ nm})}{h_{TOT}(\lambda = 405 \text{ nm})}$ |
|---|---|---|---|---|---|
| Cu | 200 | 365 | −16.98 | 183 | 1.02 |
|  |  | 405 | −21.1 | 179 |  |
|  | 300 | 365 | −16.98 | 283 | 1.01 |
|  |  | 405 | −21.1 | 279 |  |
| SiO$_2$ | 200 | 365 | −131.12 | 69 | 0.61 |
|  |  | 405 | −86.7 | 113 |  |
|  | 300 | 365 | −74.1 | 236 | 0.84 |
|  |  | 405 | −22.4 | 278 |  |
|  | 350 | 365 | −161.1 | 189 | 0.77 |
|  |  | 405 | −103.9 | 246 |  |

In one embodiment, defects are classified based on a ratio of the defect-induced phase-shifts ($\Delta\phi_d$) associated with two wavelengths, which is equivalent to the ratio of $h_{TOT}$ shown in Table 2 based on equation (3) above. For example, defects may be classified as a non-metal if the absolute value of the ratio of the defect-induced phase-shifts ($\Delta\phi_d$) is lower than a selected threshold. The threshold may be any selected value and may be adjusted based on the specific materials of interest and/or wavelengths used. For example, a threshold of 0.9 would enable classification of the Cu defect as a metal and the SiO$_2$ defect as a non-metal.

Figure 10:
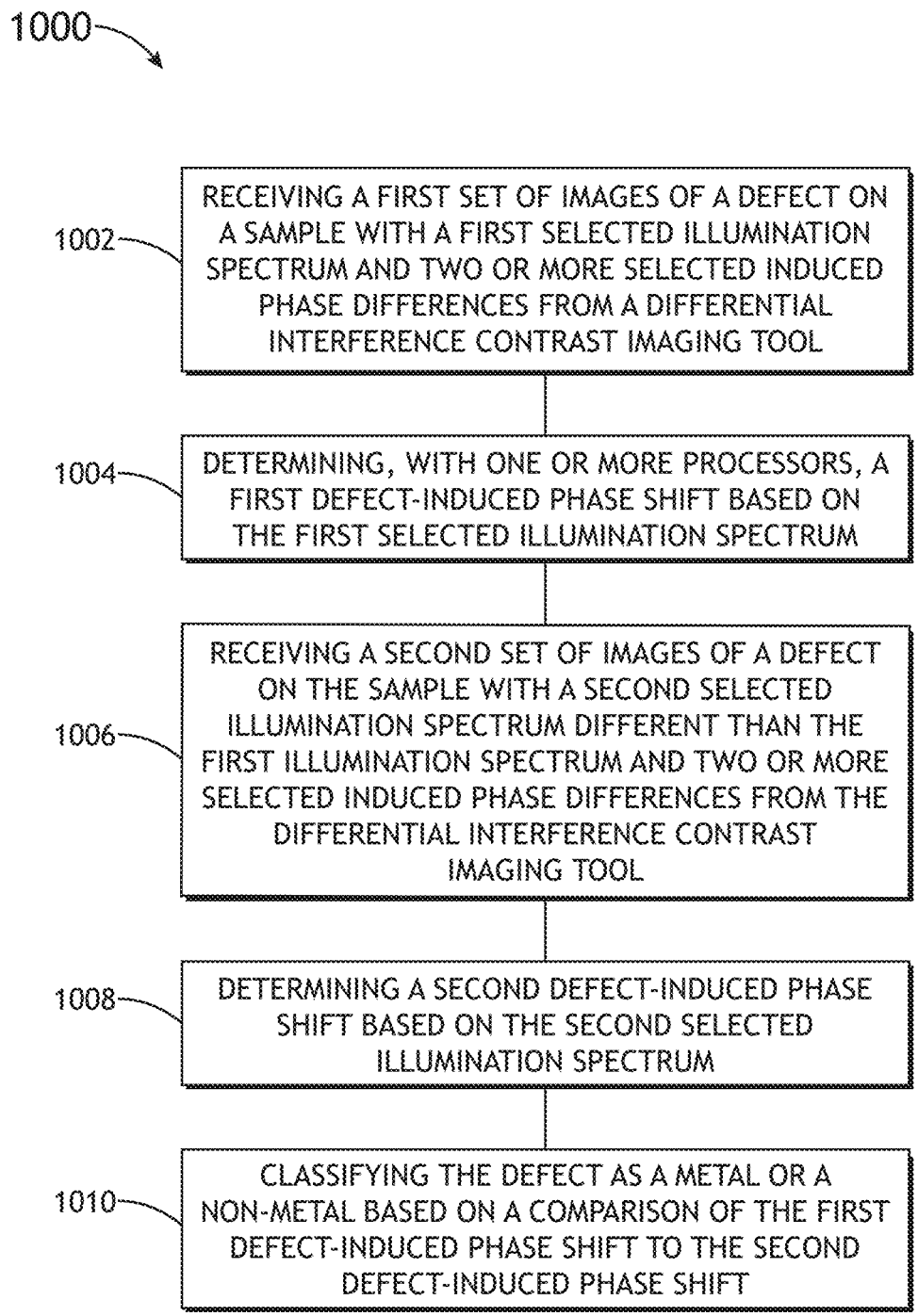
FIG. 10 is a flow diagram illustrating steps performed in a method for classifying defects, in accordance with one or more embodiments of the present disclosure.

FIG. 10 is a flow diagram illustrating steps performed in a method 1000 for classifying defects, in accordance with one or more embodiments of the present disclosure. Applicant notes that the embodiments and enabling technologies described previously herein in the context of the DIC inspection system 100 should be interpreted to extend to method 1000. It is further noted, however, that the method 1000 is not limited to the architecture of the DIC inspection system 100.

In one embodiment, the method 1000 includes a step 1002 of receiving a first set of images of a defect on a sample with a first selected illumination spectrum and two or more selected induced phase differences between two sheared illumination beams from a differential interference contrast imaging tool. In another embodiment, the method 1000 includes a step 1004 of determining a first defect-induced phase shift based on the first selected illumination spectrum. In another embodiment, the method 1000 includes a step 1006 of receiving a second set of images of a defect on the sample with a second selected illumination spectrum different than the first illumination spectrum and two or more selected induced phase differences between the two sheared illumination beams from the differential interference contrast imaging tool. In another embodiment, the method 1000 includes a step 1008 of determining a second defect-induced phase shift based on the second selected illumination spectrum. For example, the steps 1004 and 1008 may include applying a phase retrieval algorithm incorporating a phase-shifting technique using the first set of images. In another embodiment, the method 1000 includes a step 1010 of classifying the defect as a metal or a non-metal based on a comparison of the first defect-induced phase shift to the second defect-induced phase shift. For example, the step 1010 may include, but is not limited to, classifying the defect as a metal or a non-metal based on a ratio of the first defect-induced phase shift with respect to the second defect-induced phase shift. In one instance, the step 1010 includes classifying the defect as a non-metal if the absolute value of the ratio of the first defect-induced phase shift with respect to the second defect-induced phase shift is lower than a selected threshold.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An inspection system comprising:
 a controller communicatively coupled to a differential interference contrast imaging tool configured to generate one or more images of a sample based on illumination with two sheared illumination beams, wherein an illumination spectrum of the two sheared illumination beams and an induced phase difference between the two sheared illumination beams are selectable for any particular image of the sample, wherein the controller includes one or more processors configured to execute program instructions causing the one or more processors to:
  receive a first set of images of a defect on the sample with a first selected illumination spectrum and two or more selected induced phase differences between the two sheared illumination beams;
  determine a first defect-induced phase shift based on the first selected illumination spectrum;
  receive a second set of images of a defect on the sample with a second selected illumination spectrum different than the first selected illumination spectrum and two or more selected induced phase differences between the two sheared illumination beams;
  determine a second defect-induced phase shift based on the second selected illumination spectrum; and
  classify the defect as a metal or a non-metal based on a selected threshold for a ratio of the first defect-induced phase shift to the second defect-induced phase shift, wherein the selected threshold is adjustable based on at least one of a material of interest comprising the defect, the first selected illumination spectrum, or the second selected illumination spectrum, wherein the classifying the defect as a metal or a non-metal comprises:
   classifying the defect as a metal if a magnitude of the ratio is above the selected threshold; or
   classifying the defect as a non-metal if the magnitude of the ratio is equal or below the selected threshold.

2. The inspection system of claim 1, wherein the magnitude of the ratio is an absolute value of the ratio, wherein classifying the defect as a metal or a non-metal comprises:
 determining the absolute value for the ratio of the first defect-induced phase shift to the second defect-induced phase shift.

3. The inspection system of claim 1, wherein the imaging tool comprises:
 an illumination source configured to generate an illumination beam;
 a shearing prism configured to split illumination from the illumination source into the two sheared illumination beams spatially separated along a shearing direction;
 an objective lens configured to direct the two sheared illumination beams to the sample, wherein the objective lens is further configured to collect sample light, the sample light including light emanating from the sample in response to illumination with the two sheared illumination beams, wherein the shearing prism is further configured to combine portions of the sample light associated with the two sheared illumination beams into a common beam; and
 a multi-pixel detector configured to generate one or more images of the sample based on the common beam.

4. The inspection system of claim 3, wherein the shearing prism comprises:
 a Wollaston prism.

5. The inspection system of claim 3, wherein the shearing prism comprises:
 a Nomarski prism.

6. The inspection system of claim 3, wherein the multi-pixel detector comprises:
 a frame-mode detector configured to generate an image of the sample while the sample is static.

7. The inspection system of claim 6, wherein the frame-mode detector comprises:
 at least one of a charge-coupled device (CCD) or a complementary metal-oxide-semiconductor (CMOS) sensor.

8. The inspection system of claim 3, wherein the multi-pixel detector comprises:
 a scanning-mode detector configured to generate an image of the sample while the sample is in motion along a scanning direction.

9. The inspection system of claim 8, wherein the scanning-mode detector comprises:
 at least one of a line-scan sensor or a time delay integration sensor.

10. The inspection system of claim 8, wherein the shearing direction is oriented at a 45-degree angle with respect to the scanning direction.

11. The inspection system of claim 3, wherein the two or more selected induced phase differences between the two sheared illumination beams for at least one of the first set of images or the second set of images are selected by translating the shearing prism to two or more selected positions along a lateral direction with respect to an optical axis of the imaging tool.

12. The inspection system of claim 1, wherein the differential interference contrast imaging tool comprises:
 a bright-field differential interference contrast imaging tool.

13. An inspection system comprising:
 a differential interference contrast imaging tool configured to generate one or more images of the sample based on illumination with two sheared illumination beams, wherein an illumination spectrum of the two sheared illumination beams and a phase difference between the two sheared illumination beams are selectable for any particular image of the sample; and
 a controller communicatively coupled to the imaging tool, the controller including one or more processors configured to execute program instructions causing the one or more processors to:
  receive a first set of images of a defect on the sample with a first selected illumination spectrum and two or more selected induced phase differences between the two sheared illumination beams;
  determine a first phase shift associated with the defect based on the first selected illumination spectrum;

receive a second set of images of a defect on the sample with a second selected illumination spectrum different than the first selected illumination spectrum and two or more selected induced phase differences between the two sheared illumination beams;

determine a second phase shift associated with the defect based on the second selected illumination spectrum; and classify the defect as a metal or a non-metal based on a selected threshold for a ratio of the first defect-induced phase shift to the second defect-induced phase shift, wherein the selected threshold is adjustable based on at least one of a material of interest comprising the defect, the first selected illumination spectrum, or the second selected illumination spectrum, wherein classifying the defect as a metal or a non-metal comprises:

classifying the defect as a metal if a magnitude of the ratio is above the selected threshold; or classifying the defect as a non-metal if the magnitude of the ratio is equal or below the selected threshold.

14. The inspection system of claim 13, wherein the magnitude of the ratio is an absolute value of the ratio, wherein classifying the defect as a metal or a non-metal comprises:

determining an absolute value for the ratio of the first defect-induced phase shift to the second defect-induced phase shift.

15. The inspection system of claim 13, wherein the imaging tool comprises:

an illumination source configured to generate an illumination beam;

a shearing prism configured to split illumination from the illumination source into the two sheared illumination beams spatially separated along a shearing direction;

an objective lens configured to direct the two sheared illumination beams to the sample, wherein the objective lens is further configured to collect sample light, the sample light including light emanating from the sample in response to illumination with the two sheared illumination beams, wherein the shearing prism is further configured to combine portions of the sample light associated with the two sheared illumination beams into a common beam; and a multi-pixel detector configured to generate one or more images of the sample based on the common beam.

16. The inspection system of claim 15, wherein the shearing prism comprises:

a Wollaston prism.

17. The inspection system of claim 15, wherein the shearing prism comprises:

a Nomarski prism.

18. The inspection system of claim 15, wherein the multi-pixel detector comprises:

a frame-mode detector configured to generate an image of the sample while the sample is static.

19. The inspection system of claim 18, wherein the frame-mode detector comprises:

at least one of a charge-coupled device (CCD) or a complementary metal-oxide-semiconductor (CMOS) sensor.

20. The inspection system of claim 15, wherein the multi-pixel detector comprises:

a scanning-mode detector configured to generate an image of the sample while the sample is in motion along a scanning direction.

21. The inspection system of claim 20, wherein the scanning-mode detector comprises:

at least one of a line-scan sensor or a time delay integration sensor.

22. The inspection system of claim 20, wherein the shearing direction is oriented along the scanning direction.

23. The inspection system of claim 15, wherein the two or more selected induced phase differences between the two sheared illumination beams for at least one of the first set of images or the second set of images are selected by translating the shearing prism to two or more selected positions along a lateral direction with respect to an optical axis of the imaging tool.

24. The inspection system of claim 13, wherein the differential interference contrast imaging tool comprises:

a bright-field differential interference contrast imaging tool.

25. An inspection method comprising:

receiving a first set of images of a defect on a sample with a first selected illumination spectrum and two or more selected induced phase differences between two sheared illumination beams from a differential interference contrast imaging tool;

determining, with one or more processors, a first defect-induced phase shift based on the first selected illumination spectrum;

receiving a second set of images of a defect on the sample with a second selected illumination spectrum different than the first selected illumination spectrum and two or more selected induced phase differences between the two sheared illumination beams from the differential interference contrast imaging tool;

determining, with one or more processors, a second defect-induced phase shift based on the second selected illumination spectrum; and classifying, with one or more processors, the defect as a metal or a non-metal based on a selected threshold for a ratio of the first defect-induced phase shift to the second defect-induced phase shift, wherein the selected threshold is adjustable based on at least one of a material of interest comprising the defect, the first selected illumination spectrum, or the second selected illumination spectrum, wherein the classifying the defect as a metal or a non-metal comprises:

classifying the defect as a metal if a magnitude of the ratio is above the selected threshold; or classifying the defect as a non-metal if the magnitude of the ratio is equal or below the selected threshold.

26. An inspection system comprising:

a controller communicatively coupled to a differential interference contrast imaging tool configured to generate one or more images of a sample based on illumination with two sheared illumination beams, wherein an illumination spectrum of the two sheared illumination beams and an induced phase difference between the two sheared illumination beams are selectable for any particular image of the sample, wherein the controller includes one or more processors configured to execute program instructions causing the one or more processors to:

receive a first set of images of a defect on the sample with a first selected illumination spectrum and two or more selected induced phase differences between the two sheared illumination beams;

determine a first defect-induced phase shift based on the first selected illumination spectrum;

receive a second set of images of a defect on the sample with a second selected illumination spectrum different than the first selected illumination spectrum and two or more selected induced phase differences between the two sheared illumination beams;

determine a second defect-induced phase shift based on the second selected illumination spectrum; and classify the defect as a metal or a non-metal based on a selected threshold for a ratio of the first defect-induced phase shift to the second defect-induced phase shift, wherein the selected threshold is adjustable based on at least one of a material of interest comprising the defect, the first selected illumination spectrum, or the second selected illumination spectrum, wherein the classifying the defect as a metal or a non-metal comprises:

classifying the defect as a metal if a magnitude of the ratio is above the selected threshold.

27. The inspection system of claim 26, wherein classifying the defect as a metal or a non-metal comprises:
classifying the defect as a non-metal if the magnitude of the ratio is equal or below the selected threshold.

* * * * *